(12) United States Patent
Ode et al.

(10) Patent No.: US 11,147,082 B2
(45) Date of Patent: Oct. 12, 2021

(54) RADIO BASE STATION, CENTRAL APPARATUS, AND DISTRIBUTED APPARATUS

(71) Applicant: FUJITSU LIMITED, Kawasaki (JP)

(72) Inventors: Takayoshi Ode, Yokohama (JP); Yoshihiro Kawasaki, Kawasaki (JP); Shinichiro Aikawa, Yokohama (JP); Yoshiaki Ohta, Yokohama (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/184,171

(22) Filed: Nov. 8, 2018

(65) Prior Publication Data

US 2019/0075577 A1  Mar. 7, 2019

Related U.S. Application Data

(63) Continuation of application No. PCT/JP2016/002370, filed on May 13, 2016.

(51) Int. Cl.
*H04W 72/04* (2009.01)
*H04L 25/02* (2006.01)
(Continued)

(52) U.S. Cl.
CPC .......... *H04W 72/12* (2013.01); *H04W 16/26* (2013.01); *H04W 16/32* (2013.01); *H04W 88/085* (2013.01); *H04W 88/08* (2013.01)

(58) Field of Classification Search
CPC ... H04W 72/1205; H04W 4/06; H04W 72/04; H04W 88/085; H04W 72/12;
(Continued)

(56) References Cited

U.S. PATENT DOCUMENTS 9,877,351 B2 * 1/2018 Fukuta .................. H04W 76/15
2014/0226477 A1 * 8/2014 Xie ....................... H04L 47/824
370/234

(Continued)

FOREIGN PATENT DOCUMENTS

WO   2013/076899 A1   5/2013
WO   2014/112597 A1   7/2014

OTHER PUBLICATIONS

NIT Docomo, Inc., "Overall radio protocol and NW architecture for NR", Agenda Item: 10.2, 3GPP TSG-RAN WG3 meeting #91 bis, R3-160829, Bangalore, India, Apr. 11-15, 2016. (Year: 2016).*
(Continued)

*Primary Examiner* — Edan Orgad
*Assistant Examiner* — Vanneilian Lalchinthang
(74) *Attorney, Agent, or Firm* — Myers Wolin, LLC

(57) ABSTRACT

A radio base station includes: a radio communicator configured to perform radio communication; and a first controller that includes a first scheduler configured to perform a first scheduling that is at least a first part of a scheduling for the radio communication; and a second controller that is coupled to the first controller via a network, wherein the second controller comprises a second scheduler configured to perform a second scheduling that is at least a second part of the scheduling for the radio communication.

27 Claims, 11 Drawing Sheets

(51) Int. Cl.
  *H04L 12/851* (2013.01)
  *H04W 72/12* (2009.01)
  *H04W 16/26* (2009.01)
  *H04W 16/32* (2009.01)
  *H04W 88/08* (2009.01)

(58) Field of Classification Search
  CPC ........ H04W 88/08; H04L 5/003; H04L 27/26;
          H04L 69/324; H04L 47/24; H04L
          12/4604; H04L 29/08; H04L 43/16; H04B
          1/1661; H04B 1/62
  USPC .......................................................... 370/326
  See application file for complete search history.

(56) References Cited

U.S. PATENT DOCUMENTS

| | | | |
|---|---|---|---|
| 2014/0269603 A1 | 9/2014 | Aminaka et al. | |
| 2015/0023282 A1* | 1/2015 | Aiba | H04L 1/0057 370/329 |
| 2015/0341977 A1 | 11/2015 | Fukuta et al. | |
| 2016/0044637 A1* | 2/2016 | Aminaka | H04L 5/003 370/329 |
| 2016/0073265 A1* | 3/2016 | Vutukuri | H04W 12/06 455/411 |
| 2016/0119939 A1* | 4/2016 | Himayat | H04W 28/0278 370/329 |
| 2016/0198352 A1* | 7/2016 | Jarrahi Khameneh | H04L 1/1854 370/328 |
| 2016/0285935 A1* | 9/2016 | Wu | H04W 4/90 |
| 2017/0134298 A1* | 5/2017 | Walke | H04W 4/50 |
| 2017/0257876 A1* | 9/2017 | Loehr | H04L 5/0044 |
| 2018/0034669 A1* | 2/2018 | Barbieri | H04L 27/0002 |
| 2018/0077608 A1* | 3/2018 | Jung | H04W 28/02 |

OTHER PUBLICATIONS

ZTE, "Signalling for inter-eNB CoMP with non-ideal backhaul", Agenda Item: 6.2.9.2, 3GPP TSG-RAN WG1 Meeting #75, R1-135377, San Francisco, USA, Nov. 11-15, 2013. (Year: 2013).*
Nokia Siemens Networks et al., "Cell aggregation: A unified approach to CoMP and carrier aggregation", Agenda Item: 6.3.1.3, 3GPP TSG-RAN WG1 meeting #65, R1-111737, Barcelona, Spain, May 9-13, 2011.
LG Electronics, "Consideration on CoMPSimulation Assumption", Agenda Item: 6.3.1.1, 3GPP TSG-RAN WG1 meeting #63bis, R1-110383, Dublin, Ireland, Jan. 17-21, 2011.
International Search Report issued by the Japan Patent Office for corresponding International Patent Application No. PCT/JP2016/002370, dated Nov. 1, 2016, with an English translation.
Written Opinion of the International Searching Authority issued by the Japan Patent Office for corresponding International Patent Application No. PCT/JP2016/002370, dated Nov. 1, 2016, with an English translation.
NTT Docomo, Inc., "Overall radio protocol and NW architecture for NR", Agenda Item: 10.2, 3GPP TSG-RAN WG3 meeting #91bis, R3-160829, Bangalore, India, Apr. 11-15, 2016.
Samsung, "Function split between central and remote node", Agenda Item: 10.5, 3GPP TSG-RAN WG3 meeting #91bis, R3-161013, Bangalore, India, Apr. 11-15, 2016.
LG Electronics Inc., "5G user plane protocol design", Agenda Item: 9.2, 3GPP TSG-RAN WG2 Meeting #93bis, R2-162861, Dubrovnik, Croatia, Apr. 11-15, 2016.
Fujitsu, "Adaptation Function for Fronthauling", Agenda Item: 9.4.2 (User Plane), 3GPP TSG-RAN WG2 Meeting #94, R2-163774, Nanjing, China, May 23-27, 2016.
Extended European search report with supplementary European search report and the European search opinion issued by the European Patent Office for corresponding European Patent Application No. 16901587.2, dated Mar. 18, 2019.
ZTE, "Signalling for inter-eNB CoMP with non-ideal backhaul", Agenda Item: 6.2.9.2, 3GPP TSG-RAN WG1 Meeting #75, R1-135377, San Francisco, USA, Nov. 11-15, 2013.
A replacement European Search Report issued for European Patent Application No. 16901587.2, with Supplementary European Search Report and written opinion, dated Sep. 17, 2019.
Decision of Refusal issued by the Japan Patent Office for corresponding Japanese Patent Application No. 2018-516664, dated Jun. 2, 2020, with an English translation.
Notice of Reasons for Refusal issued by the Japan Patent Office for corresponding Japanese Patent Application No. 2018-516664, dated Feb. 4, 2020, with an English translation.
Communication pursuant to Article 94(3) EPC issued by the European Patent Office for corresponding European Patent Application No. 16 901 587.2-1215, dated Oct. 29, 2020.

* cited by examiner

RADIO BASE STATION, CENTRAL APPARATUS, AND DISTRIBUTED APPARATUS

CROSS-REFERENCE TO RELATED APPLICATION

This application is a continuation application of International Application PCT/JP2016/002370 filed on May 13, 2016 and designated the U.S., the entire contents of which are incorporated herein by reference.

FIELD

The present invention relates to a radio base station, a central apparatus, and a distributed apparatus.

BACKGROUND

In recent years, in a radio communication system such as a cellular phone system (cellular system) or the like, the discussion is being made on the next generation radio communication technology in order to further increase the speed and capacity of radio communication and the like. For example, in 3rd Generation Partnership Project (3GPP) which is a standardization organization, communication standard called Long Term Evolution (LTE) and communication standard called LTE-Advanced (LTE-A) based on LTE radio communication technology are proposed, and these standards are known as the 4th generation mobile communication system (so-called 4G system). In addition, in September 2015, discussion on standardization of the 5th generation mobile communication system (so-called 5G system) following these standards has started full-scale in 3GPP.

On the other hand, cellular systems such as LTE are already widely used, but these systems are made by many radio base stations forming many cells. Therefore, in recent years, many radio base stations have been installed everywhere.

As a technique for efficiently forming many cells in the related art, a technique in which one radio base station forms a plurality of cells is known. Examples of such a radio base station include a radio base station composed of one central unit (CU: Central Unit) and one or more distributed units (DU). The DU is sometimes called a remote unit (RU).

FIG. 1 illustrates an example of such a radio base station 1. In FIG. 1, the CU 11 and each DU 12 are connected by a network such as an optical fiber (called a front hole). Each DU 12 includes at least a radio unit, and each radio unit forms a cell and performs radio communication with a radio terminal (UE: User Equipment) 2. On the other hand, the CU 11 has a function of controlling at least a part of the scheduling of radio communication between each radio terminal 2 and each DU 12.

Here, the scheduling of radio communication may be paraphrased as a process of determining the method of each radio communication. In the scheduling of radio communication, for example, many parameters related to radio communication are determined, such as the timing of radio communication, subcarriers used for radio communication, modulation schemes and coding schemes (coding rate) applied to radio communication, and the like. In addition, in a broad meaning, scheduling of radio communication also includes, for example, the presence or absence of application of Coordinated Multiple Point (CoMP) transmission and reception, or determination of segmentation and concatenation of Radio Link Control (RLC) Protocol Data Unit (PDU).

According to the radio base station 1 as illustrated in FIG. 1, one radio base station 1 may form a plurality of cells (the number of cells corresponding to the number of DUs 12). As a result, it is possible to efficiently form many cells. For the sake of convenience, in the present application, the architecture of the radio base station 1 including the CU 11 and the DU 12 as described above is referred to as "centralized type".

Examples of the related art include NPL 1: 3GPP R3-160829, "Overall radio protocol and NW architecture for NR", NPL 2: 3GPP R3-161013, "Function split between central and remote node", NPL 3: 3GPP R2-162861, "5G user plane protocol design".

SUMMARY

According to an aspect of the invention, a radio base station includes: a radio communicator configured to perform radio communication; and a first controller that comprises a first scheduler configured to perform a first scheduling that is at least a first part of a scheduling for the radio communication; and a second controller that is coupled to the first controller via a network, wherein the second controller comprises a second scheduler configured to perform a second scheduling that is at least a second part of the scheduling for the radio communication.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As described above, according to a centralized radio base station 1 composed of a CU 11 and a DU 12, it is possible to efficiently form many cells. However, the inventor of the present application considers scheduling in the centralized radio base station 1 to be controversial.

In particular, as a result of examination by the inventor of the present application, as described later, it has been found that there is a deficiency that flexible radio scheduling may not be performed in the centralized radio base station 1 under predetermined conditions.

Although the description leading to the above problem has been made based on LTE, this problem also applies to other radio communication systems if the predetermined conditions are met.

The disclosed technique is made in view of the above, and it is an object of the present invention to provide a centralized radio base station, a radio communication system, and a radio communication method capable of performing flexible scheduling.

Locating the Problem

Before describing each embodiment, the location of the problem in the related art will be explained first. It is noted that this problem was newly discovered as a result of a detailed study of the related art by the inventor of the present invention and has not been known in the past.

As described above, according to a centralized radio base station 1 composed of a CU 11 and a DU 12, it is possible to efficiently form many cells. However, as a result of examination by the inventor of the present invention, as described later, it has been found that there is a case that scheduling of radio communication may not be flexibly performed in the centralized radio base station 1 under predetermined conditions.

Several viewpoints of this deficiency may be considered, but here one viewpoint will be described as an example.

Figure 1:
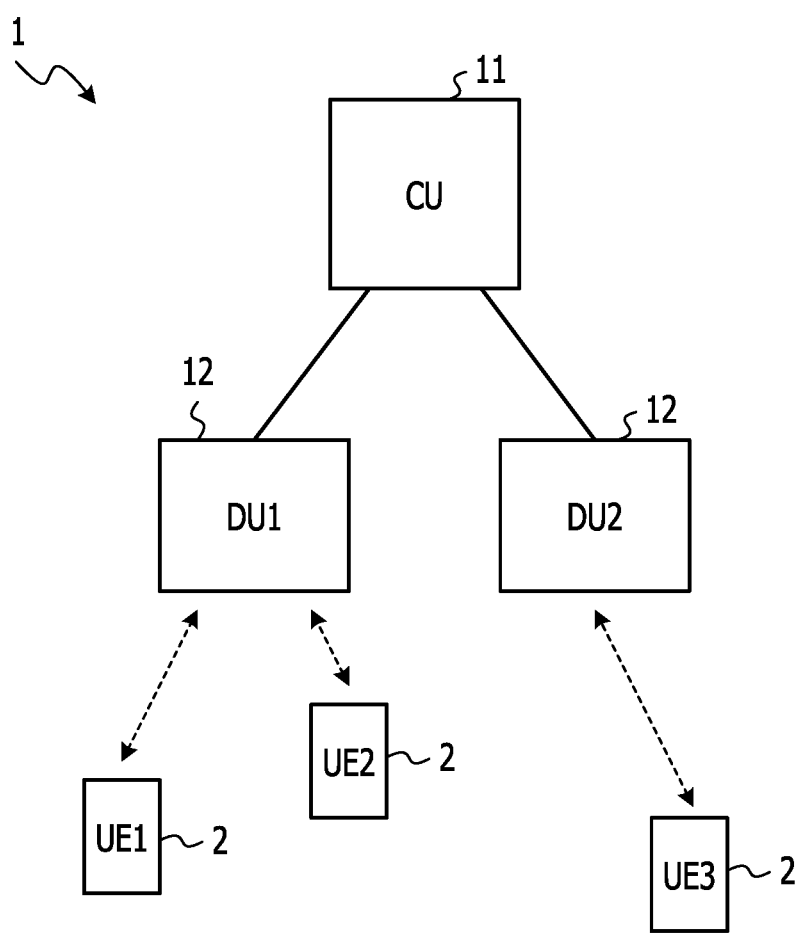
FIG. 1 is a diagram illustrating a centralized radio base station.
Figure 2:
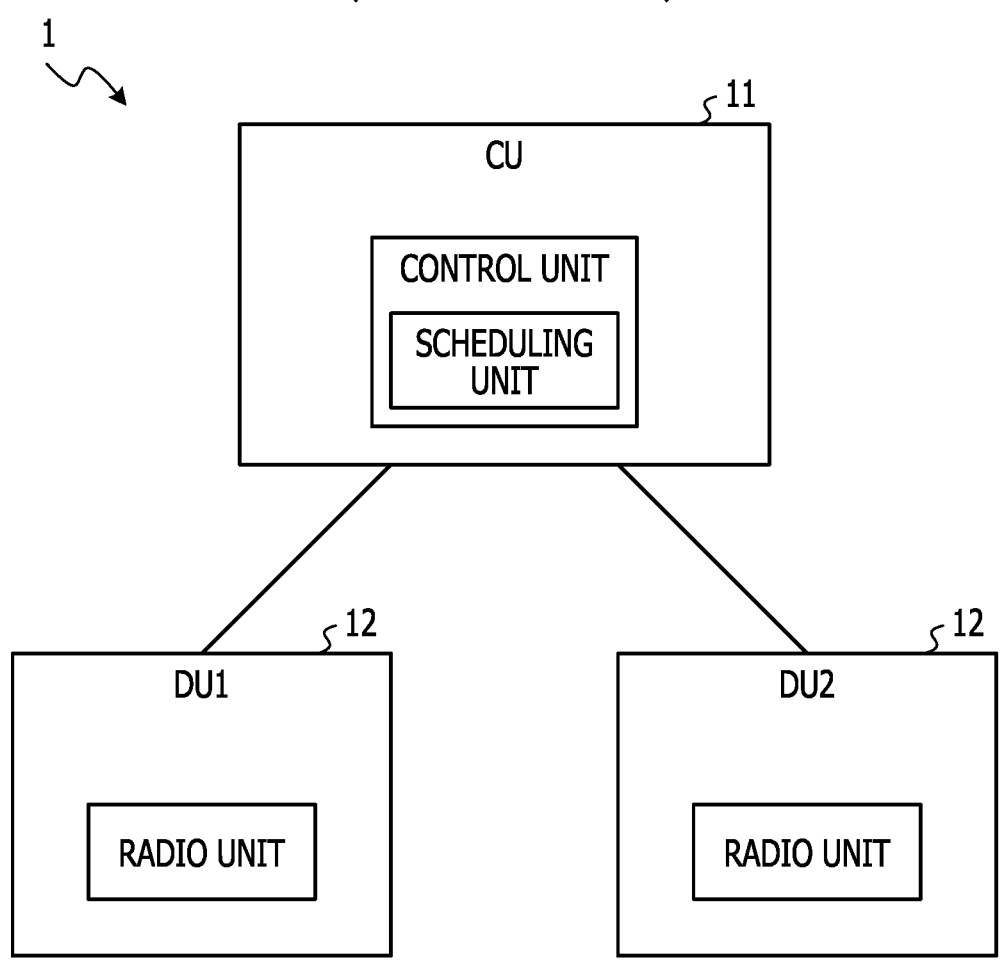
FIG. 2 is a diagram illustrating an example of a functional configuration of a centralized radio base station.

FIG. 2 illustrates a first case where the centralized radio base station 1 composed of the CU 11 and the DU 12 performs scheduling of radio communication. FIG. 2 illustrates a case where the CU 11 intensively performs the scheduling of each radio communication performed by each DU 12. This is conceivable to be the most general form of scheduling in the centralized radio base station 1.

In FIG. 2, the CU 11 includes a control unit, and the control unit includes a scheduling unit. In addition, each DU 12 includes a radio section.

In the drawings of the present application, the case where two DUs 12 (DU 121 and DU 122) are connected to one CU 11 is illustrated, but it is obvious that the number of DUs 12 connected to one CU 11 may not be fixed. In addition, in each drawing of the present application, functions other than functions that are basic for describing the present invention (for example, baseband (BB) processing function, and the like) are omitted, but it goes without saying that this point does not mean that the radio base station 1 or the like illustrated in each drawing does not have such omitted functions.

Here, this paper revisits the definition of scheduling of radio communication. As described above, the scheduling of radio communication may be paraphrased as a process of determining the mode of each radio communication. In the scheduling of radio communication, for example, many parameters related to radio communication are determined, such as the timing of radio communication (corresponding to a subframe in LTE or the like), subcarriers used for radio communication (corresponding to a resource block in LTE or the like), modulation schemes and coding schemes applied to radio communication (Modulation and Coding Scheme (MCS)) in LTE or the like), and the like. In addition, in a broad meaning, scheduling of radio communication includes, for example, processing of determining whether coordinated multiple point transmission is applied, processing of controlling segmentation and reassembly (concatenation) for RLC PDUs, and the like.

Scheduling of such radio communication is generally performed based on radio quality (quality of radio communication path). For example, Signal-to-Noise Ratio (SNR), Signal-to-Interference plus Noise Ratio (SINR), Signal-to-Noise plus Distortion Ratio (SNDR), or the like may be used as the radio quality.

In the case of downlink communication, the radio terminal 2 measures the radio quality based on a reference signal (standard signal, pilot signal) in downlink radio signals and transmits a feedback signal (feedback information) to the base station based on the measurement result. The base station may perform scheduling of downlink communication based on this feedback signal. This feedback signal is called Channel State Information (CSI) in LTE or the like. As the CSI, for example, Channel Quality Information (CQI), Precoding Matrix Indicator (PMI), and Rank Indicator (RI) may be used. CSI is a type of uplink control information (UCI).

On the other hand, in the case of uplink communication, the radio base station 1 itself may measure the radio quality based on the reference signal (standard signal) in the uplink radio signals. The base station may perform scheduling of the uplink communication based on the measurement result.

In any case, scheduling of radio communication is generally performed based on radio quality. For example, for the timing of radio communication, radio communication is performed with the best possible radio quality. In addition, for subcarriers used for radio communication, radio communication is performed by using subcarriers with the best possible radio quality. Various other matters determined in the scheduling of radio communication are also based on radio quality.

As described above, in the centralized radio base station 1, the CU 11 and each DU 12 are connected via a network called a front hole. Here, as the front hole, it is desirable to use a network having a relatively small delay (that is, low delay or high speed) such as an optical fiber or the like. However, in some cases, as the front hole, there are cases where it is inevitable to use a network having a relatively large delay (that is, high delay or low speed) such as electric wire and radio. In general, a front hole with no delay or relatively small delay is called an ideal front hole, and a front hole with a relatively large delay is called a non-ideal front hole.

For example, in developing countries and the like, a non-ideal front hole may be assumed from the viewpoint of cost and the like. Of course, in one radio base station 1, an ideal front hole and a non-ideal front hole may be mixed.

The case where the front hole is non-ideal in the centralized radio base station 1 will be examined.

As described above, for example, in the case of downlink communication, the radio terminal 2 measures the radio quality based on a reference signal in downlink radio signals and transmits a feedback signal to the base station based on the measurement result. The base station performs scheduling based on the feedback signal, and a downlink radio signal (including data and the like) is transmitted based on the scheduling result. Here, in FIG. 2, since scheduling is performed by the CU 11, a feedback signal indicating the radio quality may be delivered from the radio terminal 2 (not illustrated) to the CU 11 via the DU 12. However, in a case where the front hole is non-ideal, since the propagation delay between the DU 12 and the CU 11 is relatively large, it is difficult to reflect the latest radio quality in the scheduling. Here, the problem in downlink communication is pointed out, but it is to be noted that the circumstances remain unchanged even in uplink communication.

Therefore, in the centralized radio base station 1 as illustrated in FIG. 2, in a case where the front hole is non-ideal, there is a problem that it is difficult to perform scheduling reflecting the latest radio quality.

Figure 3:
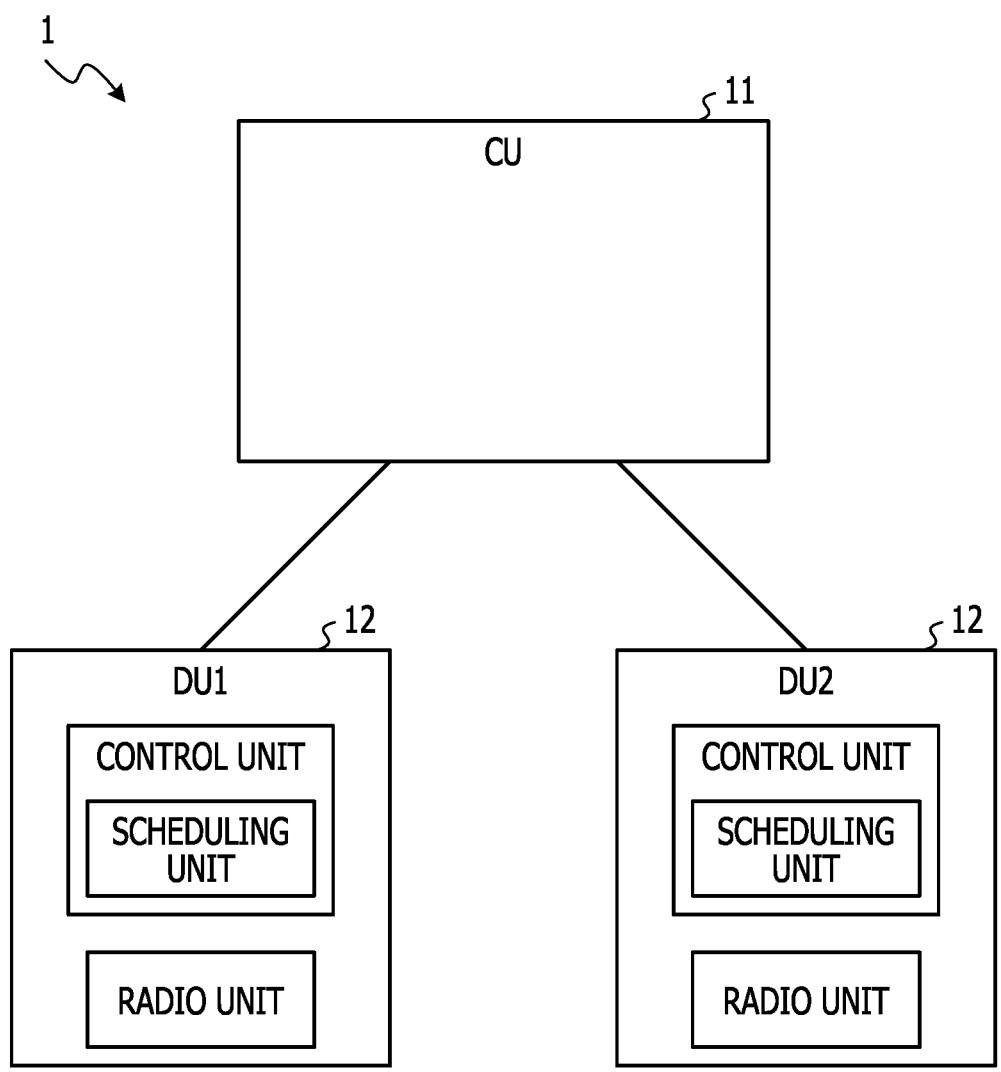
FIG. 3 is a diagram illustrating another example of the functional configuration in the centralized radio base station.

Next, FIG. 3 illustrates a second case where the centralized radio base station 1 performs scheduling of radio communication. FIG. 3 illustrates a case where each DU 12 performs scheduling of each radio communication performed by each DU 12 in a distributed manner.

In FIG. 3, each DU 12 includes a control unit, and the control unit includes a scheduling unit. In addition, each DU 12 also includes a radio unit.

In the radio base station 1 illustrated in FIG. 3, even if the front hole is non-ideal, it is conceivable that the problem described with reference to FIG. 2 does not occur. In the radio base station 1 illustrated in FIG. 3, scheduling of radio communication is performed in each DU 12 so that information related to the radio quality for scheduling and information indicating the scheduling result is not transmitted and received via the front hole.

However, it is conceivable that other problems may occur in the radio base station 1 illustrated in FIG. 3. Specifically, in the radio base station 1 illustrated in FIG. 3, since the scheduling of radio communication is performed within each DU 12 in a closed manner, scheduling is performed independently for each cell. For this reason, it is difficult for the radio base station 1 illustrated in FIG. 3 to perform various kinds of control for coordinating between the cells.

Examples of such a control include inter-cell interference control (ICIC) in addition to CoMP transmission and reception as described above. These techniques in LTE have been introduced with the aim of improving the characteristics of radio communication by coordinating between the cells. In the radio base station 1 illustrated in FIG. 3, since it is difficult to perform these various kinds of control, it may be assumed that the case where the characteristics of the radio communication may not be sufficiently established occurs.

Therefore, in the centralized type illustrated in FIG. 2, in a case where the front hole is non-ideal, it is difficult to perform scheduling reflecting the latest radio quality. On the other hand, in the centralized type illustrated in FIG. 3, it is difficult to perform various kinds of control for coordinating between the cells. Therefore, even if either of the configurations in FIGS. 2 and 3 is adopted for the centralized radio base station 1, it is conceivable that any of these problems will occur. This point is one viewpoint regarding the scheduling flexibility in the above-described centralized radio base station 1.

To summarize the above, there is a deficiency that the centralized radio base station 1 may not perform scheduling of radio communication flexibly. Several viewpoints of this deficiency may be considered, but here, as an example, the description was made from one viewpoint. Again, this deficiency has been found by a fine examination by the inventor of the present application.

As described above, scheduling of radio communication includes various functions, and in the above description, the case where all of these various functions are implemented in either CU 11 or DU 12 is described. However, it is to be noted that even in a case where some of these various functions are implemented in the CU 11 and others are implemented in the DU 12, the above-described problem occurs at least in part.

In addition, the above description has been made based on LTE or the like, but it is to be noted that this description also applies to other radio communication systems if the predetermined conditions are met.

In the following, various embodiments for solving the above problem will be described one by one in order.

First Embodiment

The first embodiment is based on the radio base station 1 includes a first device (for example, DU 12) that includes a radio unit 121 that performs radio communication with a radio terminal 2 and a first control unit 122 that controls the radio communication and a second device (for example, CU 11) that is connected to the first device via a network and includes a second control unit 111 that controls the radio communication, in which a first scheduling function that is at least a part of a scheduling function for the radio communication of the first control unit 122 and a second scheduling function that is at least a part of a scheduling function for the radio communication of the second control unit 111 are redundant.

The technical significance of the first embodiment will be explained. As described above, there is a deficiency that the centralized radio base station 1 as illustrated in FIGS. 2 and 3 may not perform scheduling of radio communication flexibly. Several viewpoints of this deficiency may be considered, but as an example, the description was made from two viewpoints.

It is conceivable that the cause of these deficiencies is that in the centralized radio base station 1 illustrated in FIG. 2, only the CU 11 is provided with a scheduling unit (scheduling function) and in the centralized radio base station 1 illustrated in FIG. 3, only the DU 12 is provided with a scheduling unit (scheduling function). That is, it is conceivable that the cause of these deficiencies is that, after all, in the centralized radio base station 1 illustrated in FIGS. 2 and 3, one of the CU 11 and the DU 12 is mutually exclusively provided with a scheduling function.

Figure 4:
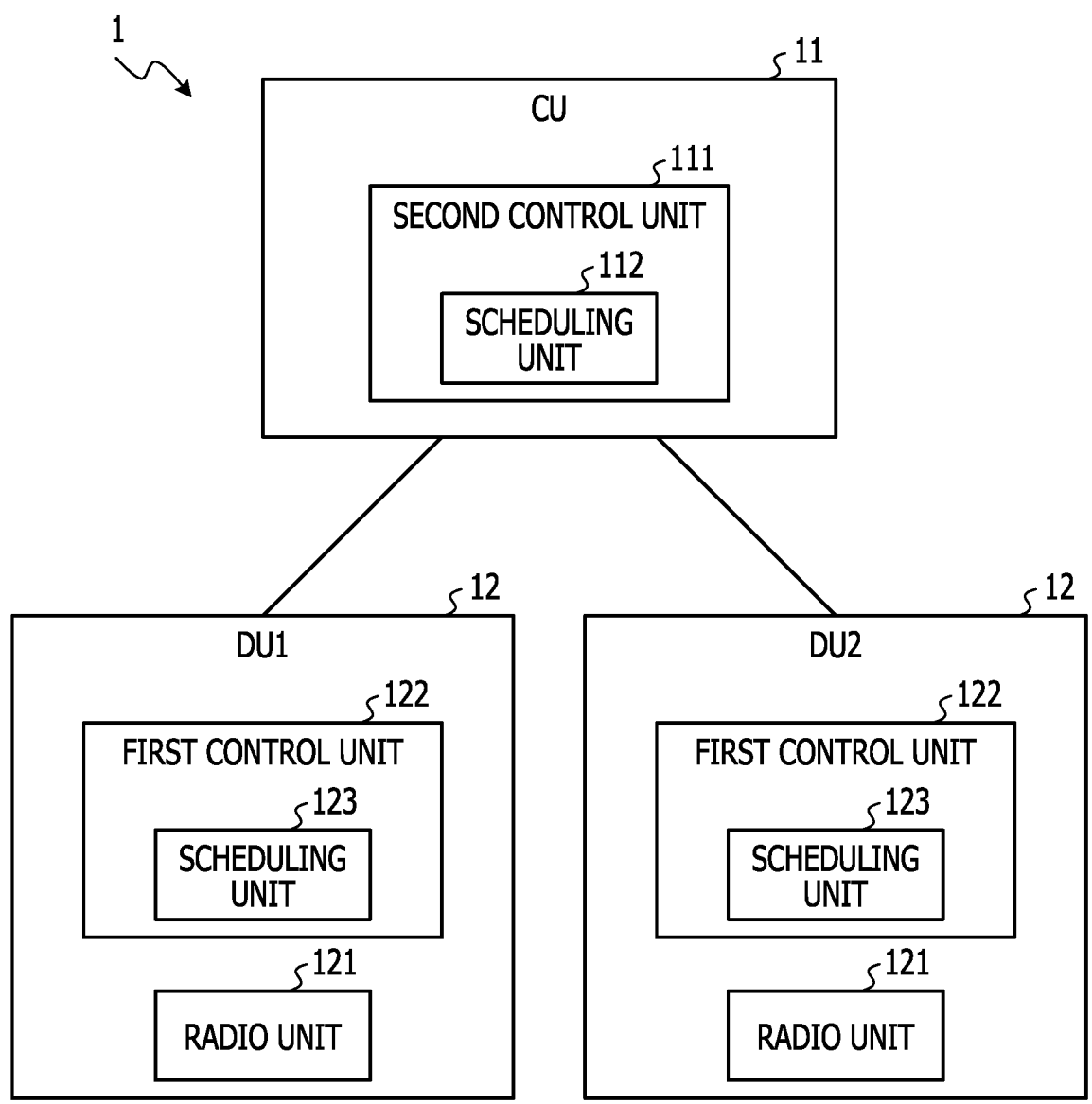
FIG. 4 is a diagram illustrating the functional configuration of a radio base station according to a first embodiment.

Therefore, in the centralized radio base station 1 according to the first embodiment, as illustrated in FIG. 4, it is assumed that the CU 11 and the DU 12 are provided with a scheduling unit (scheduling function) redundantly. That is, the second control unit 111 in the CU 11 is provided with the scheduling unit 112, and the first control unit 122 in each DU 12 is provided with a scheduling unit 123. By doing so, the radio base station 1 may appropriately select and use the scheduling function redundant in the CU 11 and the DU 12 according to the situation. As a result, it is conceivable that the above-described deficiency in the centralized radio base station 1 illustrated in FIGS. 2 and 3 is solved.

In the following description, the "scheduling function" may be replaced with the "scheduling unit" as appropriate. The difference between these terms is only emphasizing the function or emphasizing the structure, and there is not much significance in considering the substantial difference.

The technical significance of the radio base station according to the first embodiment illustrated in FIG. 4 will be described more specifically. In the base station illustrated in FIGS. 2 and 3, as described above, for example, there is a deficiency from one viewpoint.

On the other hand, according to the base station according to the first embodiment illustrated in FIG. 4, since the CU 11 and the DU 12 are provided with the scheduling function redundantly, it is possible to use the scheduling function of the DU 12 side in a case where the front hole is non-ideal, and use the scheduling function of the CU 11 side in a case where the front hole is ideal. Alternatively, according to the base station according to the first embodiment illustrated in FIG. 4, it is possible to raise the priority of using the scheduling function of the DU 12 side in a case where the front hole is non-ideal and to raise the priority of using the scheduling function of the CU 11 side in a case where the front hole is ideal. As a result, in a case where the front hole is non-ideal, it is possible to perform scheduling reflecting the latest radio quality by the scheduling function on the DU 12 side. In addition, in a case where the front hole is ideal, it is possible to perform various kinds of control to coordinate between the cells by the scheduling function of the CU 11 side. Therefore, according to the base station according to the first embodiment illustrated in FIG. 4, it is conceivable that the deficiency from one viewpoint described with reference to FIGS. 2 and 3 may be solved.

In addition to the first viewpoint described above, it is considered that the configuration illustrated in FIG. 4 may also be expected to be advantageous at least from the other three viewpoints. All of these viewpoints were obtained from a detailed analysis of the inventor. In the following, these three viewpoints will be referred to as the second to fourth viewpoints and will be described in order.

First, the second viewpoint on advantages of the radio base station 1 in FIG. 4 will be described. In the radio base station 1 illustrated in FIG. 2 described above, the CU 11 is responsible for scheduling all the DUs 12. Therefore, although the CU 11 generally has relatively large computer resources (CPU power, memory capacity, and the like), it may be assumed that the processing load of the CU 11 becomes excessively high, which may cause problems in scheduling and other processing in the CU 11.

On the other hand, in the centralized type illustrated in FIG. 3 described above, each DU 12 itself is responsible for scheduling for each DU 12. In this case, each DU 12 may only perform scheduling of radio communication by itself, but in general, the computer resources of DU 12 are relatively small. For this reason, for example, in a case where retransmission frequently occurs in the radio unit, it may be assumed that the processing load on the DU 12 increases, which may cause problems in scheduling and other processing in the DU 12.

Therefore, even if either of the configurations in FIGS. 2 and 3 is adopted for the centralized radio base station 1, it is conceivable that the problem of the processing load of the CU 11 or the processing load of the DU 12 occurs. Further, the configurations in FIGS. 2 and 3 may not dynamically cope with a change in the processing load in CU 11 or DU 12. This means that the configurations in FIGS. 2 and 3 have a deficiency in that the scheduling flexibility of the centralized radio base station 1 lacks.

On the other hand, according to the radio base station 1 according to the first embodiment illustrated in FIG. 4, since the CU 11 and the DU 12 are provided with the scheduling function redundantly, it is possible to use the scheduling function of the DU 12 side in a case where the load of the CU 11 is high and to use the scheduling function of the CU 11 side in a case where the load of the DU 12 is high. Alternatively, according to the radio base station 1 according to the first embodiment illustrated in FIG. 4, it is possible to raise the priority of using the scheduling function of the DU 12 side in a case where the load of the CU 11 is high and to raise the priority of using the scheduling function of the CU 11 side in a case where the load of the DU 12 is high. As a result, in a case where the load of the CU 11 is high, it is possible to avoid further overloading of the CU 11 due to load distribution. In addition, even in a case where the load of the DU 12 is high, it is possible to avoid further overloading of the DU 12 due to load distribution. In addition, according to the configuration of FIG. 4, it is possible to dynamically cope with a change in the processing load in CU 11 or DU 12. Therefore, according to the base station according to the first embodiment illustrated in FIG. 4, it is conceivable that the above-described deficiency may be solved.

Next, the third viewpoint on the advantages of the radio base station 1 in FIG. 4 will be described. In the configuration illustrated in FIG. 3, baseband processing and the like are performed by the DU 12, so that the signal of a lower layer never transmits through the front hole. On the other hand, in the configuration illustrated in FIG. 2, it is also possible to perform, for example, the baseband processing with the CU 11, in which case a signal of a lower layer is transmitted in the front hole. The signal of the lower layer is, for example, a Layer 1 (L1) signal.

Therefore, in a case where the amount of the signal of the low layer becomes enormous, even if the advantage of the configuration of FIG. 2 (inter-cell coordinating control and the like) is lost, it is conceivable that the configuration of FIG. 3 may be preferable to the configuration of FIG. 2. As an example of such a case, it is conceivable that the radio communication uses a millimeter wave (30 GHz to 300 GHz). The millimeter wave is high in rectilinearity and is intended for so-called line-of-sight communication, but since there are many unused bands and large capacity communication is possible, the millimeter wave is a frequency band expected to be utilized in 5G systems.

On the other hand, in the frequency band (700 MHz band to 3.5 GHz band used in the 4G system) of the cellular communication in the related art, since there are no special circumstances like millimeter waves, it is conceivable that in principle, it is desirable to enjoy the advantages of the configuration of FIG. 2.

As described above, it is conceivable that the determination as to whether to adopt either the configuration in FIG. 2 or the configuration in FIG. 3 differs depending on the frequency band used by the radio communication. However, the configurations in FIGS. 2 and 3 have a deficiency that the configurations may not sufficiently deal with only one of the millimeter wave band and the frequency band in the related art. Further, the configurations in FIGS. 2 and 3 may not dynamically cope with the change of the frequency band used by radio communication.

On the other hand, according to the radio base station 1 according to the first embodiment illustrated in FIG. 4, since the CU 11 and the DU 12 are provided with the scheduling function redundantly, it is possible to use the scheduling function of the DU 12 side in a case where radio communication uses the millimeter wave and to use the scheduling function of the CU 11 side in a case where the radio communication uses the frequency band of the cellular communication in the related art. Alternatively, according to the radio base station 1 according to the first embodiment illustrated in FIG. 4, it is possible to raise the priority of using the scheduling function of the DU 12 side in a case where the radio communication uses the millimeter wave and to raise the priority of using the scheduling function of the CU 11 side in a case where the radio communication uses the cellular communication frequency band in the related art. In addition, according to the configuration of FIG. 4, it is possible to dynamically cope with a change in the frequency band used by wireless communication. Therefore, according to the base station according to the first embodiment illustrated in FIG. 4, it is conceivable that the above-described deficiency may be solved.

Finally, the fourth viewpoint on the advantages of the radio base station 1 in FIG. 4 will be described. Although not considered specifically in the examination made so far, it is conceivable that the determination as to whether to adopt either the configuration in FIG. 2 or the configuration in FIG. 3 will be different depending on the characteristics or attributes of traffic (data).

For example, as described above, in principle, it is conceivable that the configuration in FIG. 3 is preferable in a case where the front hole is non-ideal. However, for example, for traffic (for example, traffic by smart meters in IoT (Internet of Things)) that may tolerate a certain degree of delay, even if retransmission is repeated without being able to perform scheduling based on the latest radio quality, it is conceivable that actual damage is small. Therefore, even if the front hole is non-ideal, it is conceivable that there is no problem in adopting the configuration in FIG. 2 for traffic that may tolerate a delay. On the other hand, for traffic that may not tolerate delay, such as real-time data, in a case where the front hole is non-ideal, it is conceivable that the configuration in FIG. 3 is preferable in principle.

In this way, it is conceivable that the determination as to whether to adopt either the configuration in FIG. 2 or the configuration in FIG. 3 will be different depending on the characteristics or attributes of the traffic. However, the configurations in FIGS. 2 and 3 have a deficiency that it is not possible to deal with such a determination sufficiently. Further, the configurations in FIGS. 2 and 3 may not dynamically cope with changes in traffic characteristics or attributes.

On the other hand, according to the radio base station 1 according to the first embodiment illustrated in FIG. 4, since the CU 11 and the DU 12 are provided with the scheduling function redundantly, it is possible to use the scheduling function of the CU 11 side in a case where the traffic may tolerate the delay and to use the scheduling function of the DU 12 side in a case where the traffic may not tolerate the delay. Alternatively, according to the radio base station 1 according to the first embodiment illustrated in FIG. 4, it is possible to raise the priority of using the scheduling function of the CU 11 side in a case where the traffic may tolerate the delay and to raise the priority of using the scheduling function of the DU 12 side in a case where the traffic may not tolerate the delay. In addition, according to the configuration in FIG. 4, it is possible to dynamically cope with changes in traffic characteristics or attributes. Therefore, according to the base station according to the first embodiment illustrated in FIG. 4, it is conceivable that the above-described deficiency may be solved.

In addition, as described above, the scheduling of radio communication includes various functions, and in the radio base station 1 according to the first embodiment, it goes without saying that all of these various functions may be provided redundantly in the CU 11 and the DU 12. However, in the radio base station 1 according to the first embodiment, it is to be noted that at least some of these various functions may be provided redundantly in the CU 11 and the DU 12. As an example, the scheduling function is generally configured hierarchically in general, but among the scheduling functions, functions of a relatively lower layer may be provided redundantly in the CU 11 and the DU 12, and other relatively higher layer functions may be provided only in the CU 11. As a result, it is possible to obtain the effect of the present invention with respect to the functions of the relatively lower layer which are provided redundantly by the CU 11 and the DU 12.

According to the first embodiment described above, it is possible to solve the deficiencies in the centralized type radio base station 1 from the two viewpoints regarding the flexibility of the radio scheduling described above. Therefore, according to the first embodiment, a remarkable effect that it is possible to perform scheduling of radio communication flexibility is exerted, which is not obtained in the related art.

Second Embodiment

The second embodiment is the radio base station 1 according to the first embodiment, and the second control unit 111 is based on the radio base station 1 that selects which one of the first scheduling function and the second scheduling function performs scheduling of the radio communication.

As described above, in the radio base station 1 according to the first embodiment, the scheduling function of radio communication is provided redundantly in the CU 11 and the DU 12. The radio base station 1 according to the second embodiment is an added configuration in which the CU 11 dynamically selects which one of the CU 11 side and the DU 12 side to use the scheduling function under the premise of the base station according to the first embodiment.

Figure 5:
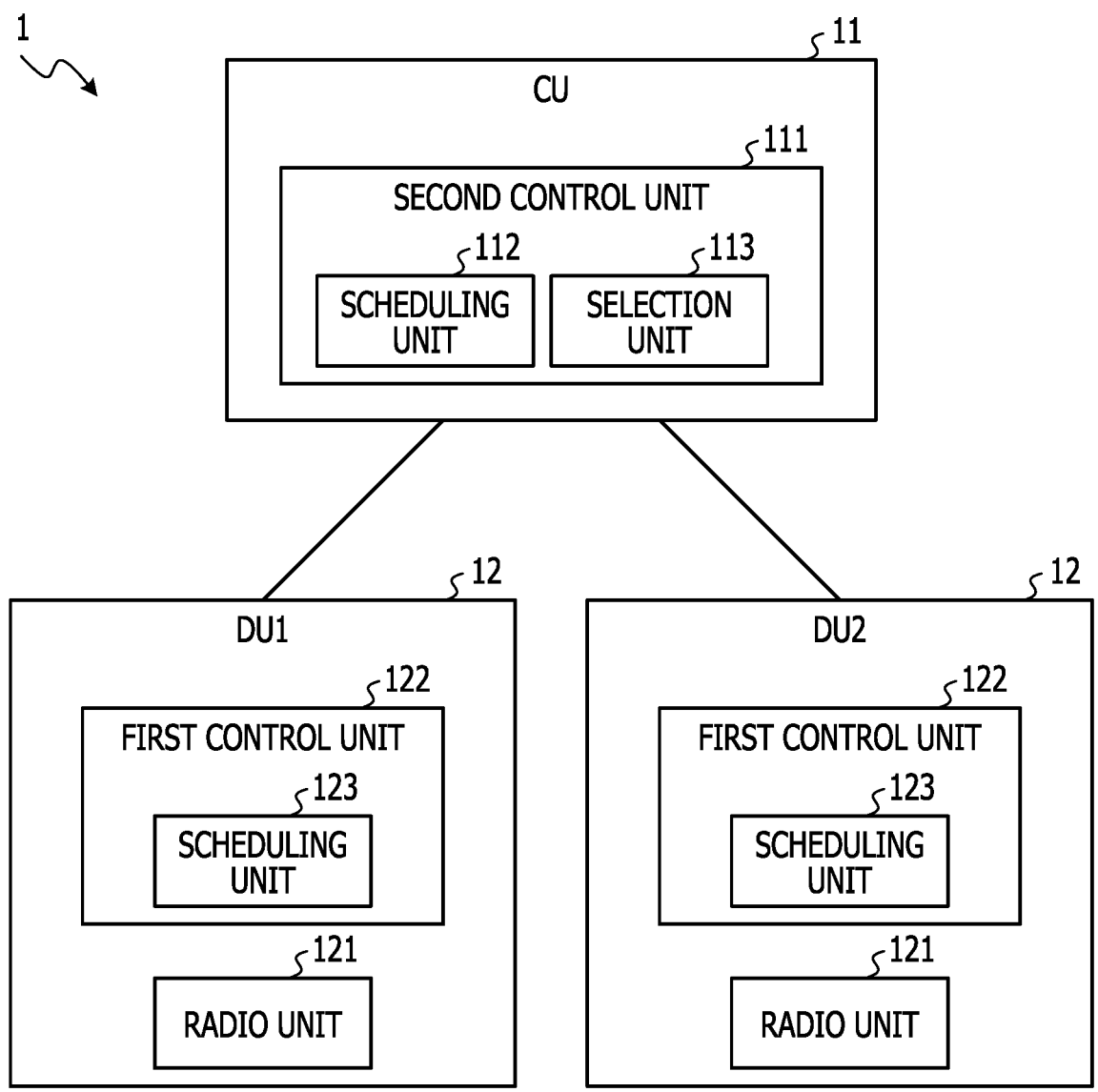
FIG. 5 is a diagram illustrating a functional configuration of a radio base station according to a second embodiment.

FIG. 5 illustrates the radio base station 1 according to the second embodiment. The radio base station 1 illustrated in FIG. 5 is different from the radio base station 1 illustrated in FIG. 4 in that a selection unit 113 is added to the second control unit 111 on the CU 11 side. The selection unit 113 selects which one of the CU 11 side and the DU 12 side to use the scheduling function.

The above selection made by the CU 11 may be made based on various criteria. As an example of selection criteria, in accordance with the above-described first viewpoint, the CU 11 may select the DU 12 side in a case where the front hole is non-ideal and may select the CU 11 side in a case where the front hole is ideal. Alternatively, it is possible to raise the priority of selecting the DU 12 side in a case where the front hole is non-ideal and to raise the priority of selecting the CU 11 side in a case where the front hole is ideal.

In this case, it is mandatory to determine whether the front hole is non-ideal or ideal, but this may be determined based on the type of the communication interface of the front hole, or it may be determined based on the communication delay of the front hole or the measured value of the Round Trip Time (RTT).

In addition, as another example of the selection criterion, in accordance with the second viewpoint described above, the CU 11 may select the DU 12 side in a case where the load of the CU 11 is high (for example, in the case of being equal to or greater than a first predetermined value) and may select the CU 11 side in a case where the load of the DU 12 is high (for example, generally, in the case of being equal to or greater than a second predetermined value smaller than the first predetermined value). Alternatively, it is possible to raise the priority of selecting the DU 12 side in a case where the load of the CU 11 is high and to raise the priority of selecting the CU 11 side in a case where the load of the DU 12 is high.

Various index values may be used as the load of the CU 11 and the DU 12, and for example, a CPU usage rate, a memory usage rate, or the like may be used. In addition, for example, it is possible to determine the load of the CU 11 or the DU 12 based on the number of the connected radio terminals 2.

Under the premise that the above selection is made based on the load of CU 11 or DU 12, in a case where loads of CU 11 and DU 12 are both low, either the scheduling function of CU 11 or DU 12 may be used, but in such a case, for example, the scheduling function of CU 11 may be fixedly used. In addition, in such a case, it is also possible to combine selection criteria based on the above-described front hole.

Further, as another example of the criterion of the above selection, in accordance with the third viewpoint described above, the CU 11 may select the DU 12 side in a case where the radio communication uses the millimeter wave and may select the CU 11 side in a case where the radio communication uses the frequency band of the cellular communication in the related art. Alternatively, in a case where the radio communication uses the millimeter wave, it is possible to raise the priority of selecting the DU 12 side and to raise the priority of selecting the CU 11 side in a case where the radio communication uses the frequency band of the cellular communication in the related art.

Further, as another example of the criterion of the above selection, in accordance with the above-described fourth viewpoint, the CU 11 may select the CU 11 side in a case where the traffic may tolerate the delay and may select the DU 12 side in a case where the traffic may not tolerate the delay. Alternatively, it is possible to raise the priority of selecting the CU 11 side in a case where the traffic may tolerate the delay and to raise the priority of selecting the DU 12 side in a case where the traffic may not tolerate the delay.

Of course, the criteria of the above four selections may be used alone, or some of the criteria may be combined. In addition, the priority (standard weight) in the case of combining several criteria may be adjusted as appropriate.

Further, the above four criteria are merely illustrative, and it goes without saying that it is also possible to apply other criteria alone or in combination.

In a case where the CU 11 makes the above selection, the scheduling function of the one selected from the CU 11 side and the DU 12 side is activated. In addition, in a case where the scheduling function of the one of the CU 11 side and the DU 12 side which has not been selected has already been activated, the scheduling function is deactivated. In a case where the scheduling function is activated or stopped on the DU 12 side, the CU 11 may notify or transmit information or a signal instructing that the activating or stopping to the DU 12 via the front hole.

In addition, as a prerequisite for the above selection, it is premised that the DU 12 side has a scheduling function, but it is also assumed that the scheduling function is not installed in the legacy or inexpensive DU 12. Therefore, when performing the above selection, in a case where it is determined (detected) whether the DU 12 has the scheduling function or not and the DU 12 is not provided with the scheduling function, the CU 11 may perform the scheduling of radio communication performed by the DU 12 in a fixed manner by the CU 11.

Further, the above selection unit may be selected appropriately and may be, for example, a traffic flow unit or a bearer unit.

According to the second embodiment described above, in addition to the effect described in the first embodiment, a remarkable effect that it is possible to appropriately select which one of the CU 11 side and the DU 12 side to use the scheduling function, is exerted, which is not obtained in the related art.

Third Embodiment

In the third embodiment, the above-described first and second embodiments are described more specifically in accordance with each function of scheduling.

In the LTE system and the like, the scheduling function in the base station includes, for example, the functions of selection (routing) of DU 12, segmentation or concatenation of upper packets, adaptive modulation coding (AMC: Adaptive Modulation and Coding), and other functions (for example, radio resource selection, transmission data amount selection, selection of the radio terminal 2 for performing communication, and the like). Among these functions, the selection function (routing) of the DU 12 is naturally provided by the CU 11. In addition, generally, only either the CU 11 or the DU 12 is provided with segmentation or concatenation function and the functions such as AMC and the like.

Figure 6:
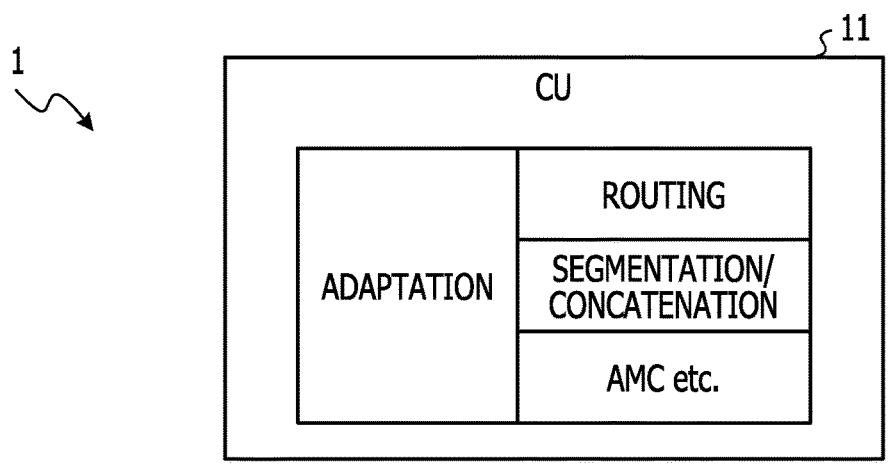
FIG. 6 is a diagram illustrating a functional configuration of a radio base station according to a third embodiment.
Figure 6:
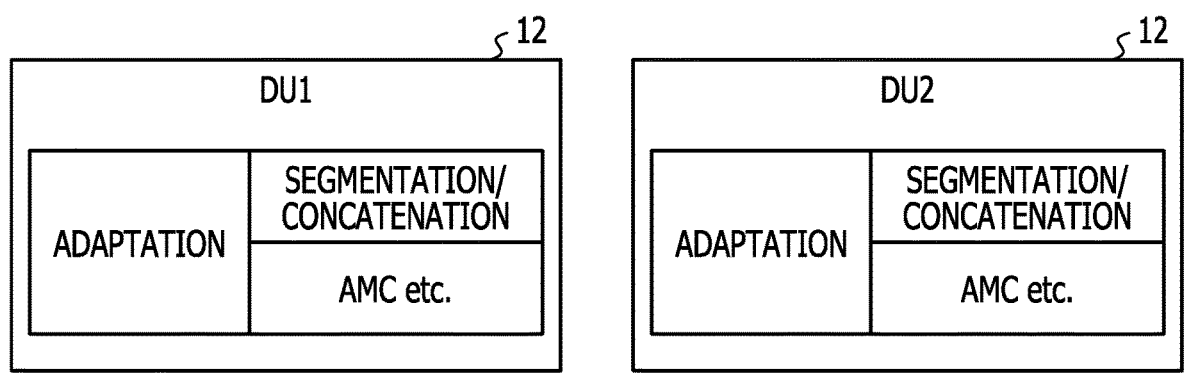

On the other hand, in the radio base station 1 according to the third embodiment, as illustrated in FIG. 6, segmentation or concatenation function, and functions such as AMC and the like are provided redundantly in both the CU 11 and the DU 12. In addition, an adaptation function has been added, but this is a function that is not provided in the radio base station 1 such as the LTE system in the related art. The adaptation function is a function of selecting one of the CU 11 and the DU 12 based on various criteria, and the adaptation function on the CU 11 side, in particular, corresponds to the selection unit 113 in the second embodiment.

In the following, as an example, it will be described whether each scheduling function in the radio base station 1 according to the third embodiment operates in accordance with the selection criteria based on the above-described first viewpoint. It goes without saying that the other selection criteria described above may be considered similarly to the description below.

Figure 7:
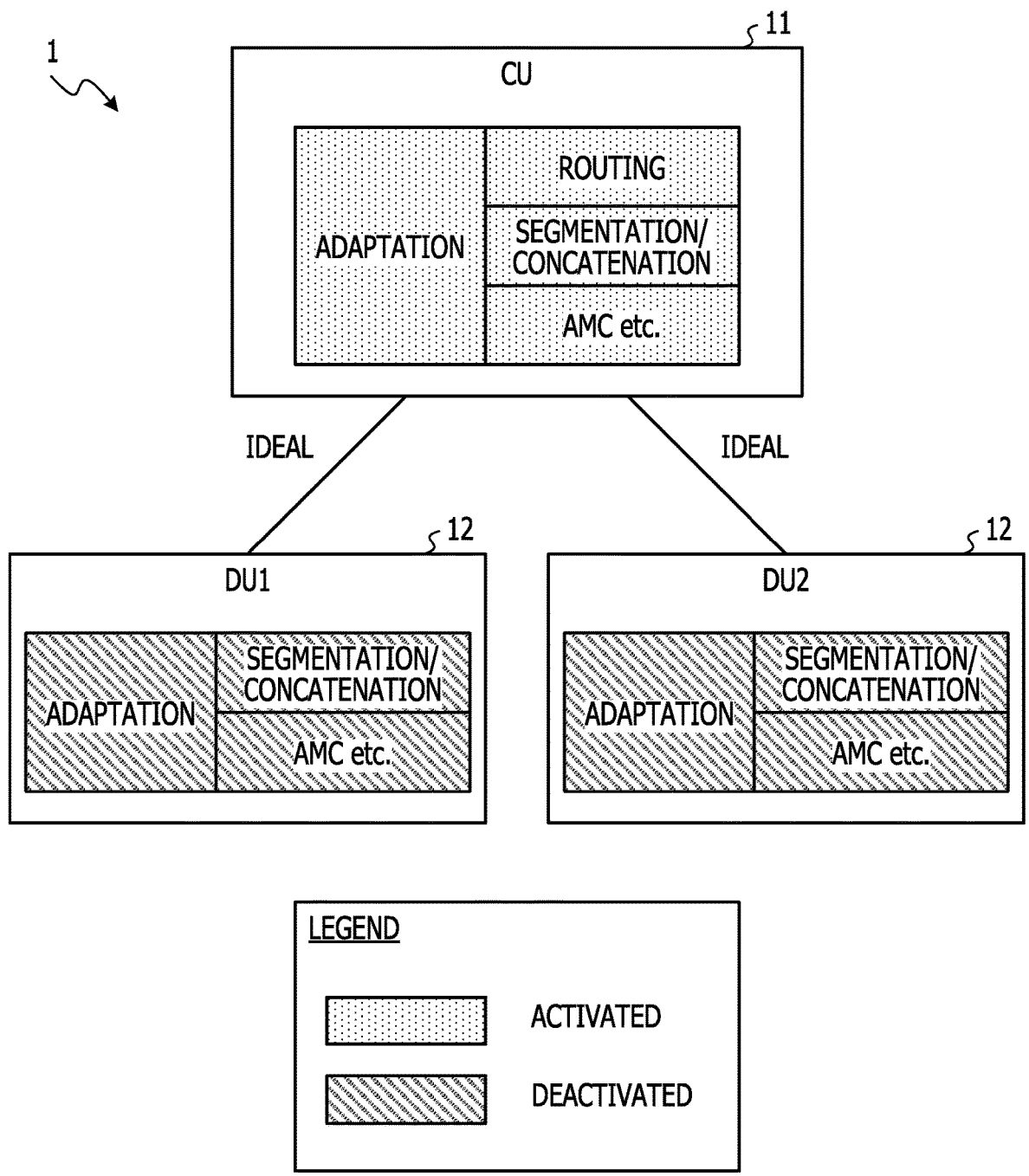
FIG. 7 is a diagram illustrating an operation example (part 1) of each function in the radio base station according to the third embodiment.

FIG. 7 is a diagram illustrating an example of the state of the operation of the radio base station 1 according to the third embodiment in a case where both of the two front holes are ideal. In FIGS. 7 to 10, the dot pattern portion indicates the activated scheduling function, and the shaded pattern portion indicates the deactivated scheduling function. In FIG. 7, all functions of routing, segmentation or concatenation functions, AMC, and the like in the CU 11 are activated, and all functions of segmentation or concatenation function, AMC, and the like in the DU 12 are all stopped. Activation and stop of each function are controlled by an adaptation function.

Figure 8:
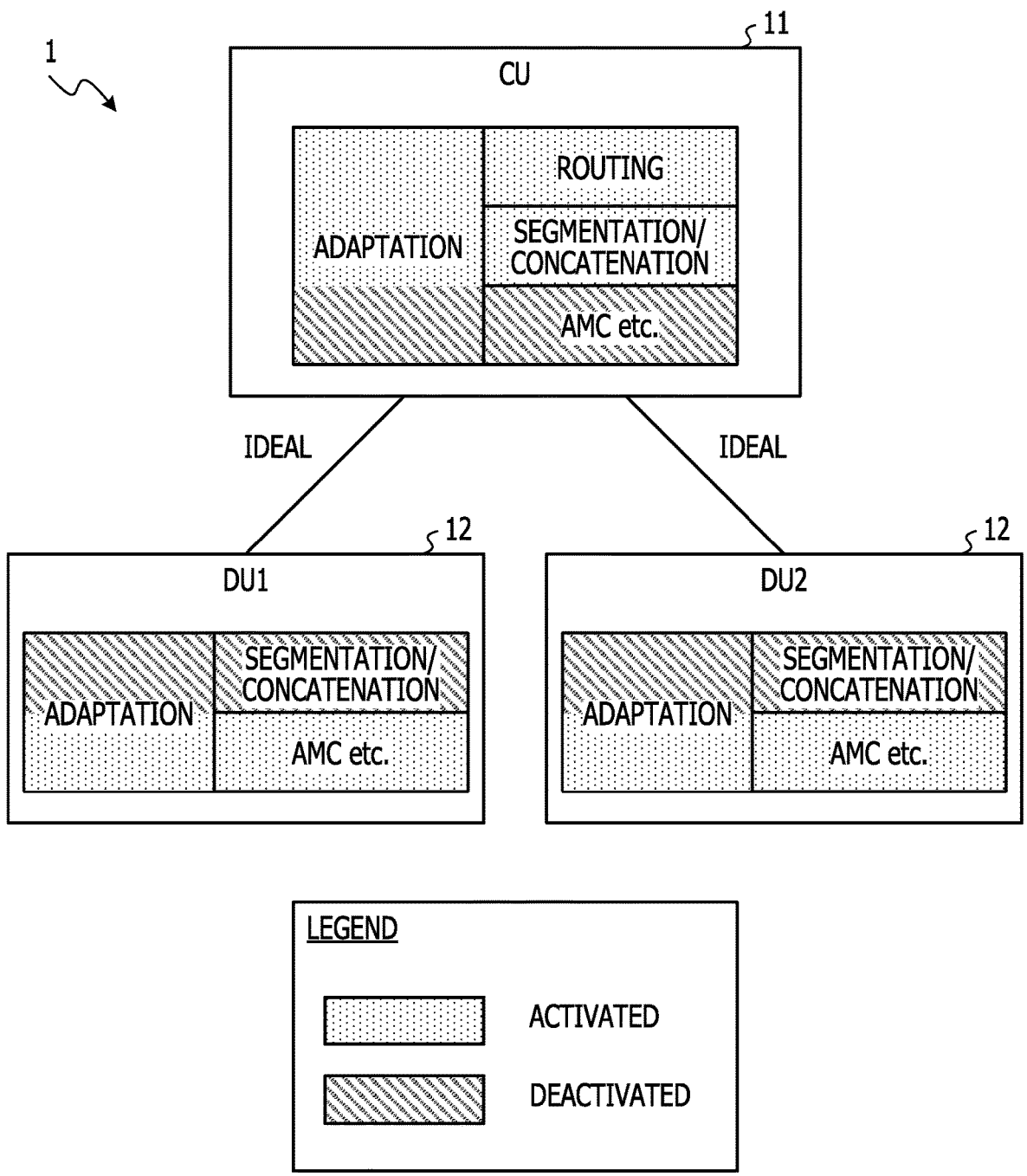
FIG. 8 is a diagram illustrating an operation example (part 2) of each function in the radio base station according to the third embodiment.

FIG. 8 is a diagram illustrating another example of the state of the operation of the radio base station 1 according to the third embodiment in a case where both of the two front holes are ideal. In FIG. 8, functions of routing, segmentation or concatenation in the CU 11 are activated, and functions such as AMC and the like in the CU 11 are stopped. On the other hand, the segmentation or concatenation function in the DU 12 is stopped, and functions such as AMC and the like in the CU 11 are activated. Activation and stop of each function are controlled by an adaptation function.

Figure 9:
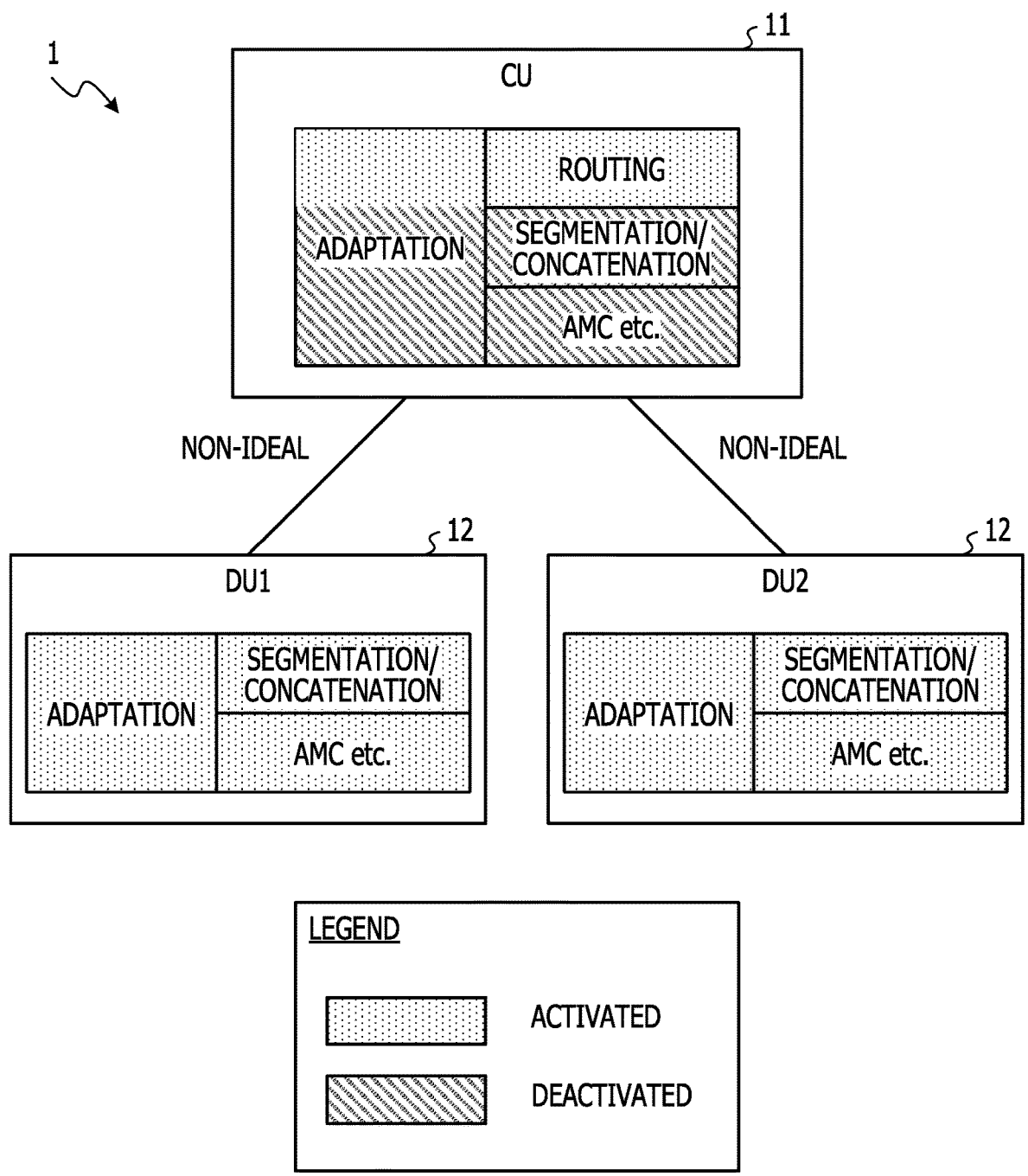
FIG. 9 is a diagram illustrating an operation example (part 3) of each function in the radio base station according to the third embodiment.

FIG. 9 is a diagram illustrating an example of the state of the operation of the radio base station 1 according to the third embodiment in a case where both of the two front holes are non-ideal. In FIG. 9, routing in the CU 11 is activated, and segmentation or concatenation function, and functions such as AMC and the like in the CU 11 are stopped. On the other hand, the segmentation or concatenation function in the DU 12 and the functions such as AMC and the like are activated. Activation and stop of each function are controlled by an adaptation function.

Figure 10:
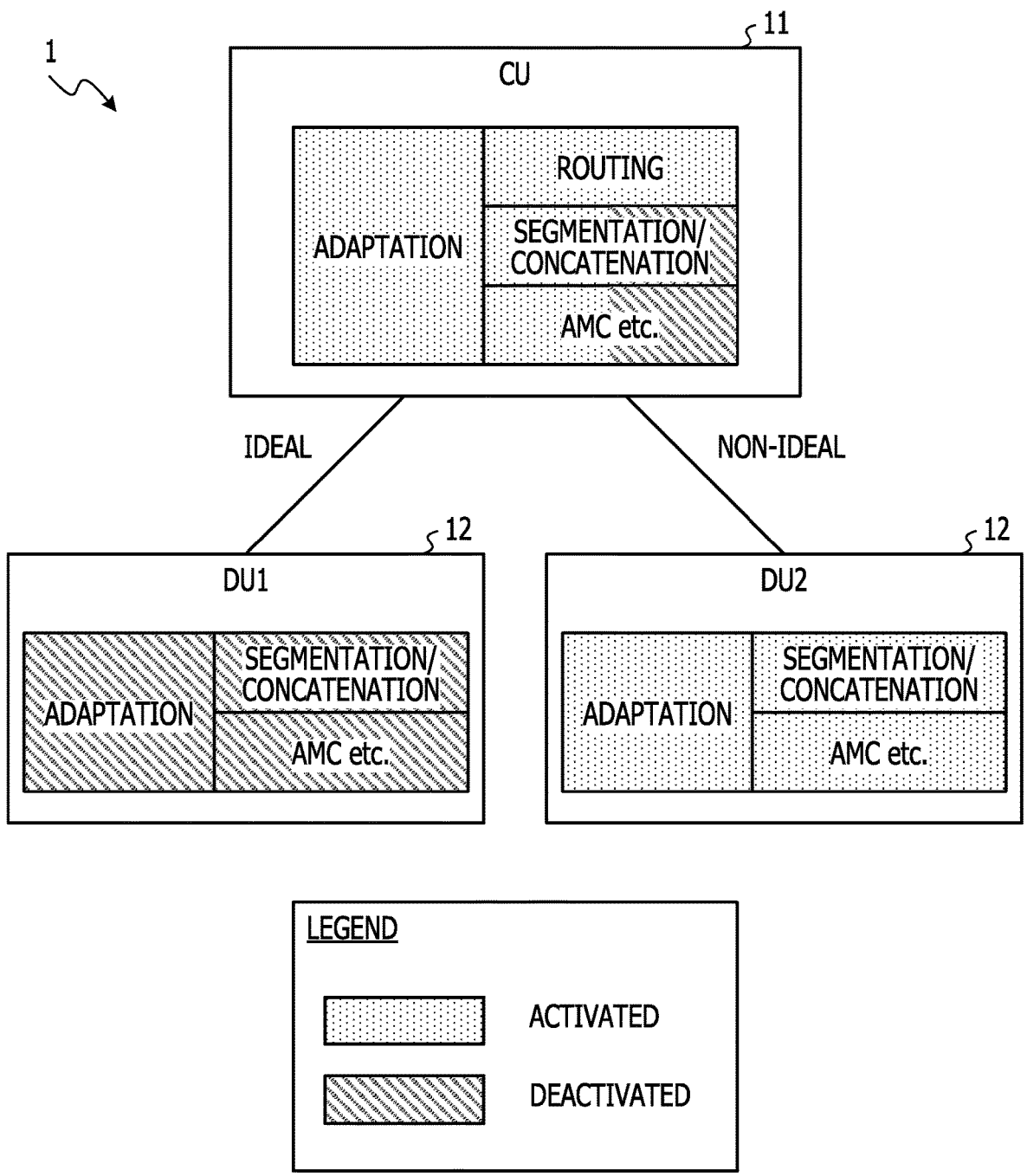
FIG. 10 is a diagram illustrating an operation example (part 4) of each function in the radio base station according to the third embodiment.

FIG. 10 is a diagram illustrating an example of the state of the operation of the radio base station 1 according to the third embodiment in a case where one of the two front holes is ideal and the other is non-ideal. In FIG. 10, routing in the CU 11 is activated. For the ideal front hole, the segmentation or concatenation function in the CU 11 and the functions such as AMC are also activated, and the segmentation or concatenation function in the DU 12 and the functions such as AMC are stopped. For the non-ideal front hole, the segmentation or concatenation function in the CU 11 and the functions such as AMC are stopped, and the segmentation or concatenation function in the DU 12 and the functions such as AMC are activated. Activation and stop of each function are controlled by an adaptation function.

According to the third embodiment described above, remarkable effects similar to those of each of the above-described embodiments are exerted.

[Hardware Configuration of Radio Base Station 1 in Each Embodiment]

Figure 11:
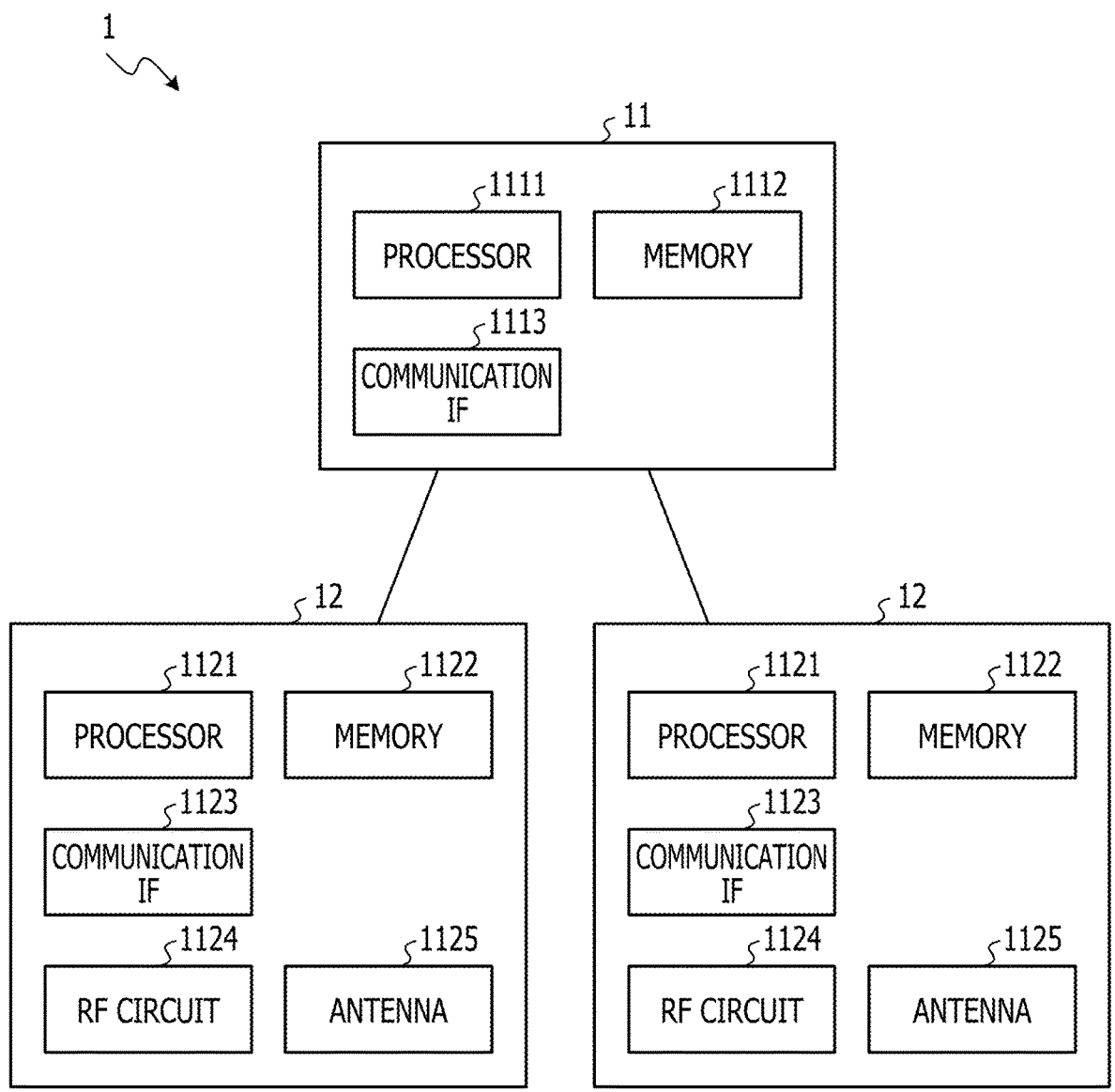
FIG. 11 is an example of a hardware configuration diagram of a radio base station according to each embodiment.

With reference to FIG. 11, the hardware configuration of the radio base station 1 in each embodiment will be described.

FIG. 11 is a diagram illustrating an example of a hardware configuration of the radio base station 1. As illustrated in FIG. 11, the radio base station 1 is provided with a CU 11 and each DU 12, and a network (front hole) is connected therebetween. The CU 11 is provided with, for example, a processor 1111, a memory 1112, and a communication IF (interface) 1113. In addition, each DU 12 is provided with, for example, a processor 1121, a memory 1122, a communication IF 1123, an RF circuit 1124, and an antenna 1125.

The processor 1111 provided in the CU 11 and the processor 1121 provided in each DU 12 are, for example, a Central Processing Unit (CPU) or a Digital Signal Processor (DSP). In the present application, the processor 1111 provided in the CU 11 and the processor 1121 provided in each DU 12 may be realized by a digital electronic circuit. Examples of the digital electronic circuit include Field-Programming Gate Array (FPGA), Application Specific Integrated Circuit (ASIC), Large Scale Integration (LSI), and the like.

The memory 1112 provided in the CU 11 and the memory 1121 provided in each DU 12 include at least one of Random Access Memory (RAM) such as Synchronous Dynamic Random Access Memory (SDRAM), a Read Only Memory (ROM), and a flash memory and store programs, control information, and data. Besides this, the radio base station 11 may be provided with an auxiliary storage device (hard disk or the like) not illustrated and the like.

The communication IF 1113 provided in the CU 11 and the communication IF 1123 provided in each DU 12 are communication interfaces using, for example, an optical fiber, electric wire, radio, or the like.

The correspondence between the functional configuration of the radio base station 11 illustrated in FIGS. 4 to 5 and the hardware configuration of the radio base station 11 illustrated in FIG. 11 will be described.

The second control unit 111 in the CU 11 is realized by, for example, a processor 1111, a memory 1112, a digital electronic circuit (not illustrated), and the like.

The radio unit 121 in each DU 12 is realized by, for example, an RF circuit 1124, an antenna 1125, an analog electronic circuit (not illustrated), and the like. The first control unit 122 in the DU 12 is realized by, for example, a processor 1121, a memory 1122, a digital electronic circuit (not illustrated), and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio base station comprising:
at least one first device that forms a cell and performs radio communication with a wireless terminal, the at least one first device including a first controller that comprises a first processor, the first processor configured to execute a first scheduling process that includes at least a first part of a scheduling process for the radio communication, wherein the number of cells formed corresponds to a number of the at least one first device; and
a second device including a second controller that is coupled to the first controller via a network, wherein the second controller is capable of controlling at least a part of the radio communication with the wireless terminal, the second controller comprising a second processor, the second processor configured to execute a second scheduling process that includes at least a second part of the scheduling process for the radio communication, the second part of the scheduling process including higher layer functions not included in the at least the first part of a scheduling process, and wherein the radio base station adaptively adjusts the scheduling process performed by the second controller and the first controller for the radio communication according to at least one of a plurality of radio communication parameters.

2. The radio base station of claim 1, wherein the first scheduling process comprises processing of a dividing or a combining of upper packets.

3. The radio base station of claim 1, wherein the second scheduling process comprises processing of a dividing or a combining of upper packets.

4. The radio base station of claim 1, wherein the first scheduling process comprises processing of segmentation and concatenation of data, and the second scheduling process includes at least processing of routing.

5. The radio base station of claim 1, wherein the first scheduling process in the first processor includes radio link control (RLC) processing.

6. The radio base station of claim 1, wherein the first controller is a distributed unit.

7. The radio base station of claim 1, wherein the second controller is a central unit.

8. A central apparatus of a base station comprising:
a second processor configured to be coupled to at least one distributed apparatus of the base station via a network, the at least one distributed apparatus forms a cell and includes a radio communicator and a first processor, the radio communicator configured to perform a radio communication, wherein the second processor is capable of controlling at least a part of the radio communication, and the first processor configured to execute a first scheduling process that includes at least a first part of a scheduling process for the radio communication, wherein the number of cells formed corresponds to a number of the at least one distributed apparatus, wherein the second processor is configured to execute a second scheduling process that includes at least a second part of the scheduling process for the radio communication, the second part of the scheduling process including higher layer functions not included in the at least the first part of a scheduling process, and wherein the scheduling process performed by the second processor and the first processor for the radio communication is adaptively adjusted according to at least one of a plurality of radio communication parameters.

9. The central apparatus of claim 8, wherein the second scheduling process in the second processor comprises processing of a dividing or a combining of upper packets.

10. The central apparatus of claim 8, wherein the second scheduling process in the second processor includes at least processing of routing.

11. The central apparatus of claim 8, wherein the first scheduling process in the first processor includes processing of segmentation and concatenation of data.

12. The central apparatus of claim 8, wherein the first scheduling process in the first processor includes processing of segmentation and concatenation of data, and the second scheduling process in the second processor includes at least processing of routing.

13. The central apparatus of claim 8, wherein the first scheduling process in the first processor includes radio link control (RLC) processing.

14. A distributed apparatus of a base station comprising:
a radio communicator that forms a cell and is configured to perform a radio communication; and
a first processor coupled to a central apparatus of the base station via a network, the first processor configured to control a first part of the radio communication, the central apparatus including a second processor, the second processor configured to execute a second scheduling process that includes at least a second part of a scheduling process for the radio communication and capable of controlling at least a part of the radio communication, wherein the first processor is configured to execute a first scheduling process that includes at least a first part of the scheduling process for the radio communication, the second part of the scheduling process including higher layer functions not included in the at least the first part of a scheduling process, and wherein the scheduling process performed by the second processor and the first processor for the radio communication is adaptively adjusted according to at least one of a plurality of radio communication parameters.

15. The distributed apparatus of claim 14, wherein the first scheduling process in the first processor comprises processing of a dividing or a combining of upper packets.

16. The distributed apparatus of claim 14, wherein the second scheduling process in the second processor comprises processing of a dividing or a combining of upper packets.

17. The distributed apparatus of claim 14, wherein the first scheduling process in the first processor includes processing of segmentation and concatenation of data.

18. The distributed apparatus of claim 14, wherein the second scheduling process includes at least processing of routing.

19. The distributed apparatus of claim 14, wherein the first scheduling process comprises processing of segmentation and concatenation of data, and the second scheduling process includes at least processing of routing.

20. The distributed apparatus of claim 14, wherein the first scheduling process in the first processor includes radio link control (RLC) processing.

21. A method of scheduling radio communication comprising:
performing radio communication with a wireless terminal in at least one first device of a base station, the at least one first device forming a cell, wherein the number of cells formed corresponds to a number of the at least one first device;
executing a first scheduling process, in the at least one first device, that includes at least a first part of a scheduling process for the radio communication;
coupling a second device, of the base station that is capable of controlling at least a part of the radio communication with the wireless terminal, to the at least one first device via a network;
executing, in the second device, a second scheduling process that includes at least a second part of the scheduling process for the radio communication, the second part of the scheduling process including higher layer functions not included in the at least the first part of a scheduling process; and
adaptively adjusting the scheduling process performed by the second device and the at least one first device for the radio communication according to at least one of a plurality of radio communication parameters.

22. The method according to claim 21, wherein the first scheduling process comprises a dividing or a combining of upper packets.

23. The method according to claim 21, wherein the second scheduling process comprises a dividing or a combining of upper packets.

24. The method according to claim 21, wherein the first scheduling process includes segmentation and concatenation of data.

25. The method according to claim 21, wherein the second scheduling process includes a processing of routing.

26. The method according to claim 21, wherein the at least one first device is a distributed unit.

27. The method according to claim 21, wherein the second device is a central unit.

* * * * *